United States Patent [19]

Riemer

[11] 4,414,731
[45] Nov. 15, 1983

[54] METHOD OF MANUFACTURE OF RAISED RELIEF ILLUMINATED GLOBE

[75] Inventor: Wolfgang J. Riemer, Chicago, Ill.
[73] Assignee: Replogle Globes, Inc., Chicago, Ill.
[21] Appl. No.: 270,494
[22] Filed: Jun. 4, 1981

Related U.S. Application Data

[62] Division of Ser. No. 135,538, Mar. 31, 1980, Pat. No. 4,300,887.
[51] Int. Cl.³ .............. B29D 9/00; B29C 17/04; B29C 27/00
[52] U.S. Cl. .............................. 29/453; 29/463; 29/525; 156/245; 156/304.5; 264/513; 264/545; 264/553; 264/135; 264/247; 264/266; 264/267
[58] Field of Search ............ 264/129, 132, 134, 135, 264/267–269, 245, 246, 250, 503, 512, 531, 544, 247, 294, 509, 291–293, 266, 530, 513, 545, 553; 156/224, 242, 245, 304.5, 244.21, 244.13; 29/453, 428, 463

[56] References Cited

U.S. PATENT DOCUMENTS

| | | |
|---|---|---|
| Re. 26,413 | 6/1968 | Keyes .................... 264/548 |
| 878,308 | 2/1908 | Patesson . |
| 1,798,644 | 3/1981 | Wheat et al. ............ 434/138 |
| 2,096,389 | 10/1937 | Bode ....................... 428/41 |
| 2,365,637 | 12/1944 | Helwig .................... 264/547 |
| 2,377,946 | 6/1945 | Leary ...................... 264/522 |
| 2,493,439 | 1/1950 | Braund .................... 264/552 |
| 2,591,779 | 4/1952 | Buck ....................... 428/138 |
| 2,622,356 | 12/1952 | Valente .................... 40/206 |
| 2,655,330 | 10/1953 | Martinez .................. 428/11 |
| 2,809,448 | 10/1957 | Oestergaard et al. ..... 434/145 |
| 2,877,570 | 3/1959 | Starworth ................ 434/132 |
| 2,917,783 | 12/1959 | Olson et al. ............. 264/547 |
| 2,975,538 | 3/1961 | Murfin ..................... 40/20 R |
| 3,010,152 | 11/1961 | Braund .................... 264/554 |
| 3,016,629 | 1/1962 | Case . |
| 3,055,124 | 9/1962 | Gilmer, Jr. et al. . |
| 3,055,124 | 9/1962 | Gilmer et al. ........... 434/132 |
| 3,077,040 | 2/1963 | Stieber et al. ........... 434/131 |
| 3,077,658 | 2/1963 | Wharton .................. 264/266 |
| 3,095,261 | 6/1963 | Meyer ..................... 428/11 |
| 3,123,863 | 3/1964 | Reilly et al. ............. 264/554 |
| 3,207,821 | 9/1965 | Jones-Hinton et al. ... 264/554 |
| 3,225,461 | 12/1965 | Snyder .................... 264/509 |
| 3,225,461 | 12/1965 | Snyder . |
| 3,350,799 | 11/1967 | Japs ........................ 40/2 R |
| 3,442,996 | 5/1969 | Fisher et al. ............ 264/546 |
| 3,488,414 | 1/1970 | Naples .................... 264/522 |
| 3,511,655 | 5/1970 | Haas et al. .............. 430/10 |
| 3,524,795 | 8/1970 | Petersen ................. 264/171 |
| 3,557,945 | 1/1971 | Gourio .................... 428/11 |
| 3,758,358 | 9/1973 | Kuroda ................... 156/222 |
| 3,784,512 | 3/1957 | Goodwin ................. 428/11 |
| 3,791,899 | 2/1974 | Walters ................... 156/152 |
| 3,806,397 | 4/1974 | Kukoff .................... 425/253 |
| 3,889,407 | 6/1975 | Elzer ....................... 40/2 R |
| 4,016,235 | 4/1977 | Ferro ...................... 264/266 |
| 4,196,238 | 4/1980 | Wiggins .................. 428/11 |
| 4,205,036 | 5/1980 | Trame ..................... 264/135 |

FOREIGN PATENT DOCUMENTS 1168058 4/1964 Fed. Rep. of Germany ........ 428/11
1292467 10/1972 United Kingdom .

OTHER PUBLICATIONS

Simonds et al., Handbook of Plastics, van Nostrand, N.Y. (1944) pp. 43 & 748.

Primary Examiner—Willard E. Hoag
Attorney, Agent, or Firm—Allegretti, Newitt, Witcoff & McAndrews, Ltd.

[57] ABSTRACT

A method of manufacturing a raised relief, illuminated globe includes printing a hemispherical map design on a flat vinyl plastic sheet, forming the vinyl plastic sheet into a substantially hemispherical shape, positioning the hemispherically formed sheet in a mold cavity, positioning a mold core on the back side of the sheet, injection molding a styrene backing for the hemispherical shaped sheet to conform the sheet with the mold cavity including relief areas defined in the cavity wall, and removing the molded hemisphere from the mold. A second molded hemisphere is produced in substantially the same manner and is attached to the first hemisphere to form a complete globe. The printed map design of the globe is positioned in the mold cavity to insure that the relief areas are properly positioned with respect to the design.

6 Claims, 12 Drawing Figures

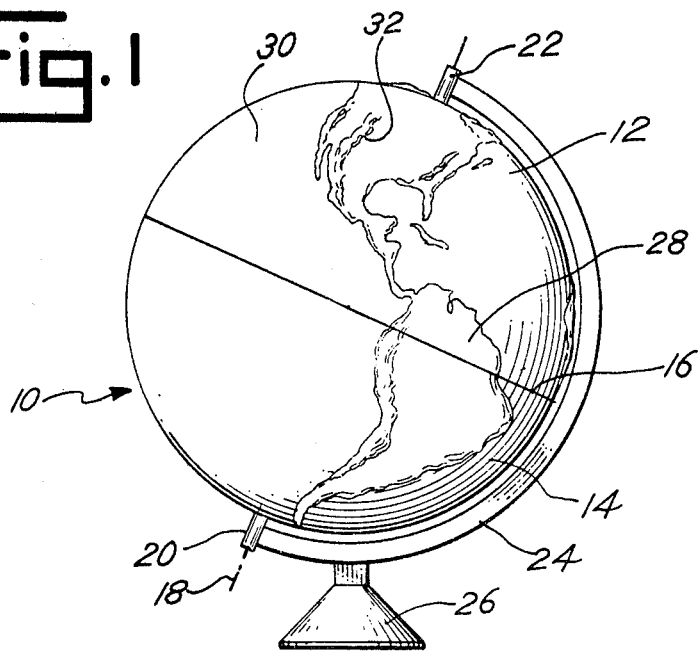
Fig. 1
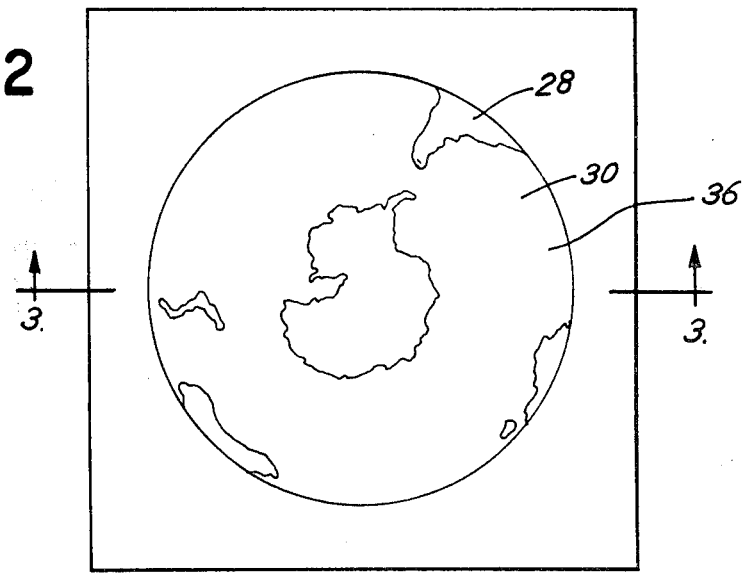
Fig. 2
Fig. 3
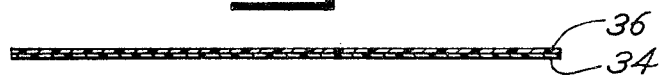

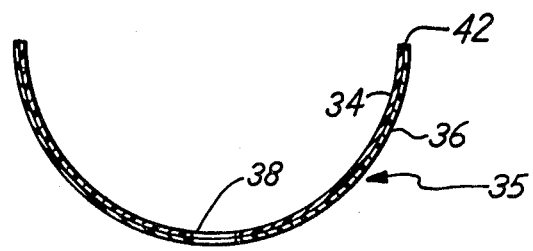
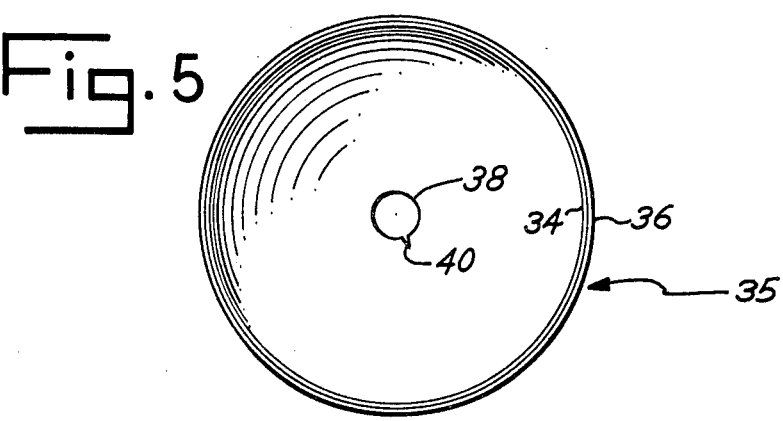
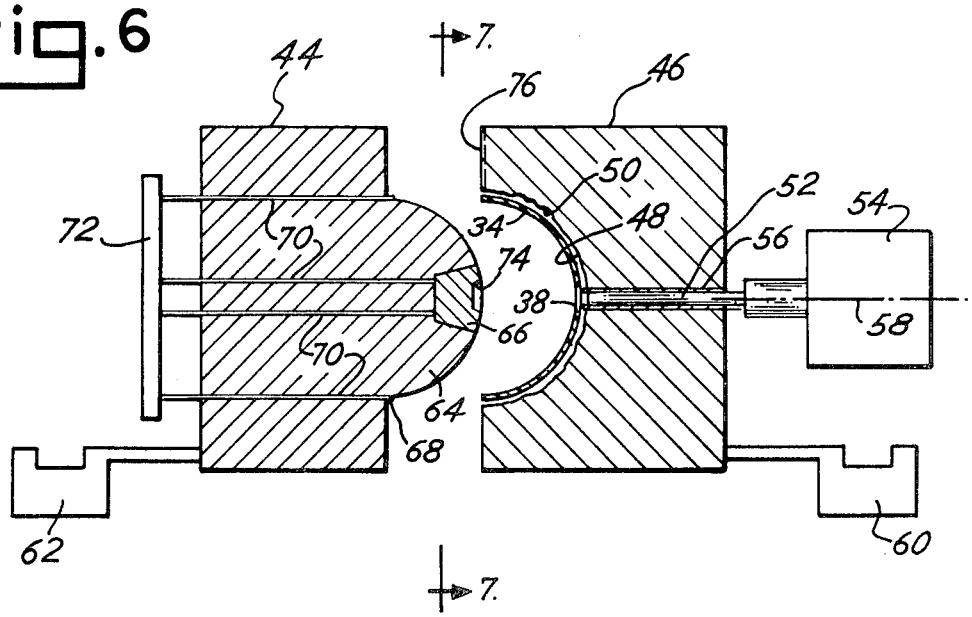

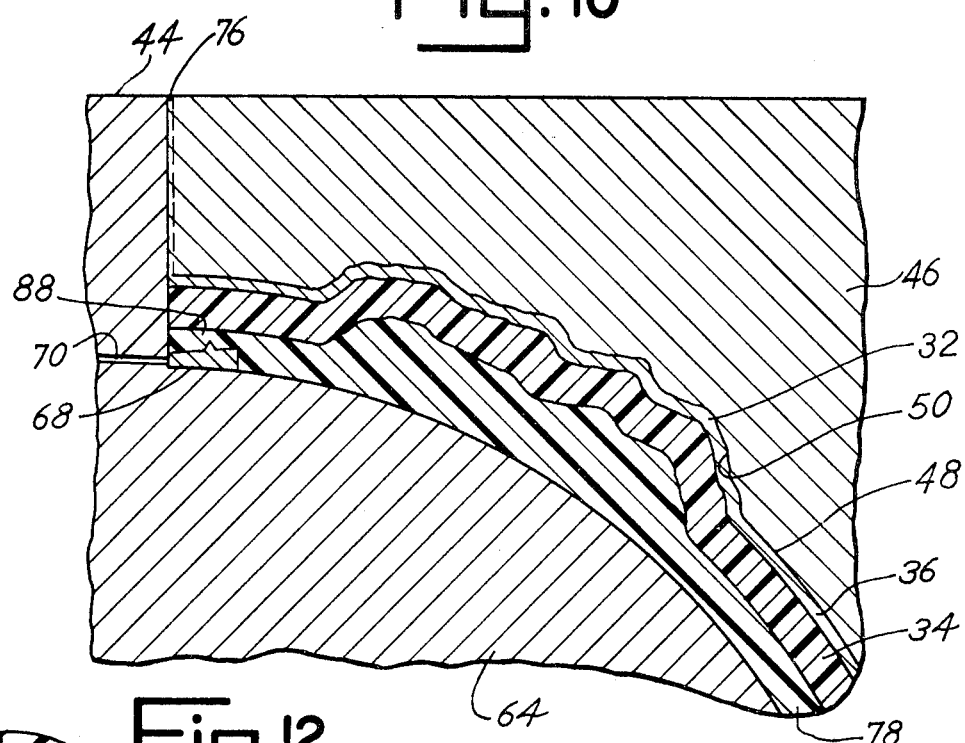
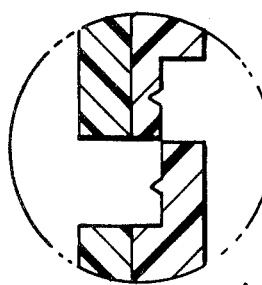
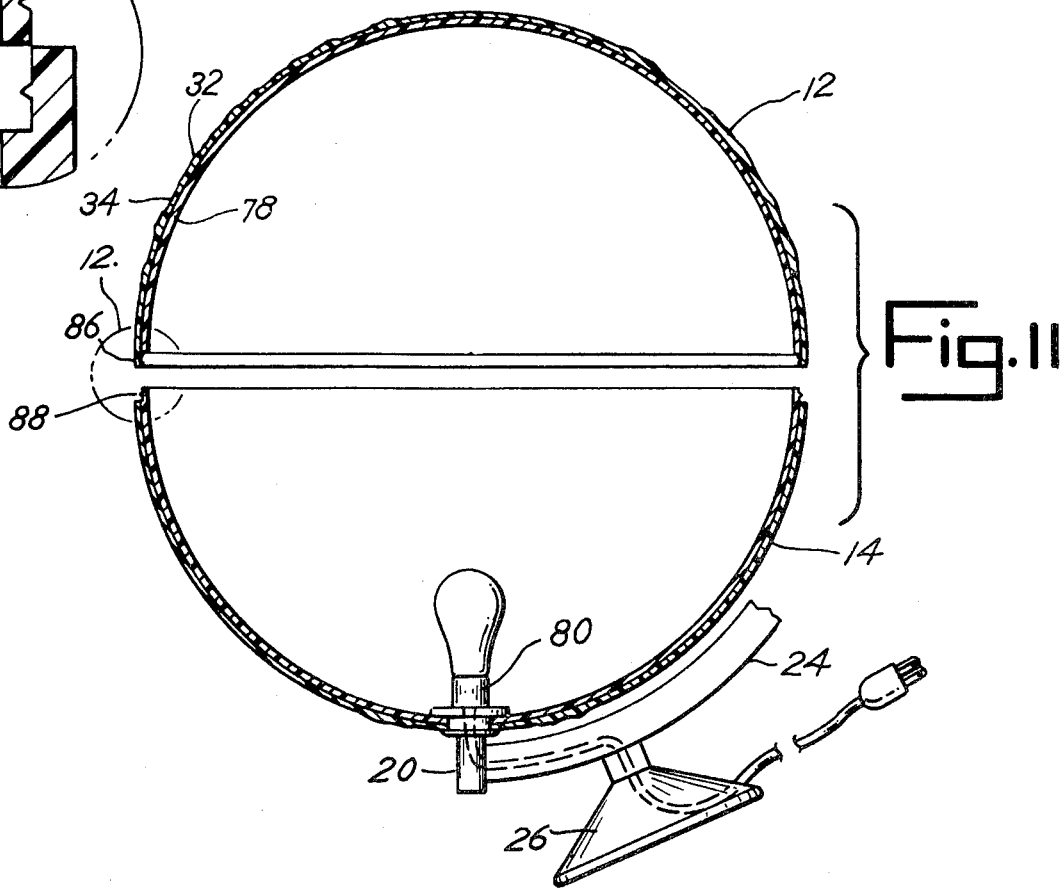

4,414,731

METHOD OF MANUFACTURE OF RAISED RELIEF ILLUMINATED GLOBE

This is a division of application Ser. No. 135,538, filed Mar. 31, 1980, now U.S. Pat. No. 4,300,887.

BACKGROUND OF THE INVENTION

This invention relates to an improved relief surface globe and to an improved method for manufacturing a globe with a relief surface.

As used herein, the term "relief" or "in relief" refers to the configuration of the surface of a globe resulting from embossing of forming the material used to make a globe so that mountains, valleys and other terrestrial features are reproduced three dimensionally on the globe surface.

Providing maps in relief has been known since at least 1908, see e.g., Patesson, U.S. Pat. No. 878,308. Globes or spherical representations of the earth having relief areas were known at least since 1962, see e.g., Case, U.S. Pat. No. 3,016,629; Gilmer, Jr. et al, U.S. Pat. No. 3,055,124; and Synder, U.S. Pat. No. 3,225,461.

Heretofore, in the process for forming a relief map or globe, an embossing step is performed on a flat, pre-printed sheet of plastic either prior to or simultaneous with the forming of the sheet into a hemispherical shape. Such embossing and globe formation is augmented by vacuum forming techniques. The structural support for the relief area, as taught by the prior art, is a natural consequence of the inherent rigidity of the plastic material used to make the globe. Forming a thick printed sheet of material is an expensive and difficult task. The present invention provides an improved method for forming a relief globe particularly from a translucent material.

SUMMARY OF THE INVENTION

This invention comprises a globe in relief and a method for manufacture of such a globe including the steps of: printing a predetermined substantially two dimensional map pattern onto a thin, flexible, flat plastic sheet; shaping the plastic sheet into a substantially hemispherical shape or into some other curved configuration that represents a portion of a sphere; positioning the shaped sheet in a mold cavity which includes a relief area pattern; positioning a mold core in spaced relation to the back side of the flexible plastic sheet; injecting a hardenable plastic material between the mold core and sheet to form the sheet against the mold cavity and thereby define relief areas in a predetermined three-dimensional pattern on the sheet; and hardening a layer of the plastic material onto the back side of the sheet to fill the cavities with a substantially solid material and provide a solid backing for the entire surface of the sheet. Other portions of the globe are produced in substantially the same manner and thereafter secured together to provide a complete globe in relief. The printed areas of the globe correspond with the relief areas to a high degree of accuracy. The assembled globe is hollow and formed from a material which is translucent to a light source positioned within the globe.

Thus, an object of the present invention is to provide an improved globe with a relief surface and to provide a method for manufacturing a globe with a relief surface.

A further object of this invention is to provide a method of manufacturing a globe with a relief surface that avoids the inaccuracies of conventional manufacturing techniques.

Another object of the present invention is to provide a method of globe manufacture wherein the relief areas are formed simultaneously with providing a solid, rigid backing for the globe form.

Another object of the present invention is to provide a globe with a relief surface and a method for manufacturing such a globe in which the relief areas have greater structural integrity and durability than is achieved by prior art globe manufacturing techniques.

Another object of the present invention is to provide a globe which is especially adapted to be internally illuminated.

These and other objects, advantages and features of the present invention will be set forth in more detail in the description which follows.

BRIEF DESCRIPTION OF THE DRAWING

In the detailed description which follows, reference will be made to the drawing comprised of the following figures:

FIG. 1 is a side plan view of a globe made in accordance with the present invention;

FIG. 2 is a top plan view of a planar map projection on a sheet prior to forming the sheet into a hemispherical shape;

FIG. 3 is an enlarged cross sectional view of the sheet of FIG. 2 taken along the line 3—3;

FIG. 4 is a side cross sectional view of the sheet of FIG. 2 subsequent to forming the sheet into a hemispherical shape;

FIG. 5 is a top plan view of the sheet of FIG. 4;

FIG. 6 is a side cross sectional view illustrating the manner in which the hemispherical sheet shown in FIGS. 4 and 5 is placed into a mold cavity;

FIG. 10 is an enlarged cross sectional view of the globe mold core and mold cavity during the forming operation of FIG. 8;

FIG. 11 is an exploded cross sectional view of the globe of FIG. 1 illustrating the manner in which the globe sections are assembled; and FIG. 12 is an enlarged partial cross sectional view of the hemisphere locking arrangement for the globe of the invention.

DESCRIPTION OF THE PREFERRED EMBODIMENT

Figure 7:
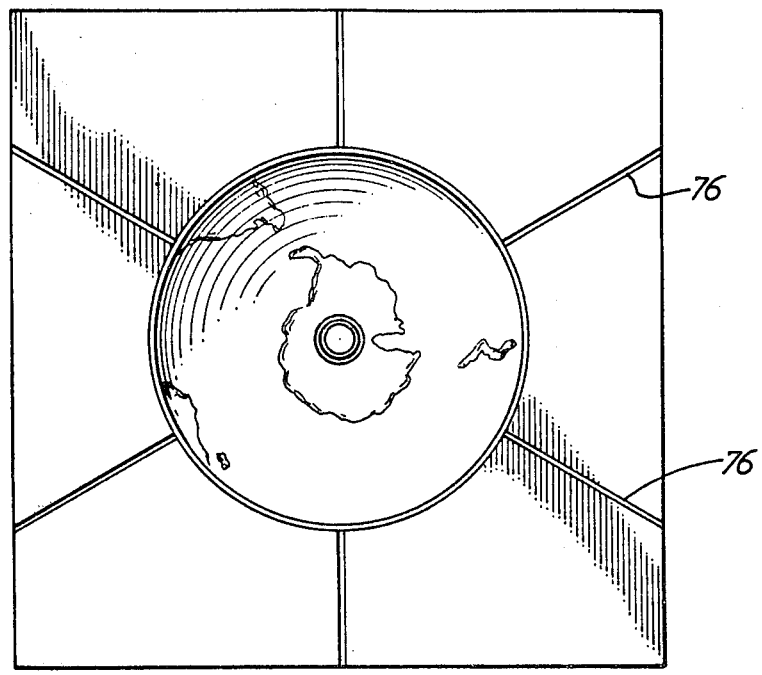
FIG. 7 is a plan view of the mold core shown in FIG. 6 taken substantially along the line 7—7.

FIG. 1 illustrates a typical globe 10 made in accordance with the process of the present invention. Globe 10 is comprised of northern and southern hemisphere portions 12 and 14, respectively, joined together at the equator 16. The globe 10 is mounted on a polar axis 18 by means of polar supports 20 and 22. A support ring 24 is attached to the supports 20, 22 and, in turn, is affixed to a stand 26 in a conventional manner to support the globe 10.

The globe 10 includes a printed surface which defines land masses 28 and water areas 30. Portions of the globe are formed with a relief pattern or areas 32 which is associated with terrestrial features such as mountains or the like. The globe 10 thus provides a three dimensional representation of the surface of the earth.

Additionally, the material from which the globe 10 is formed is generally translucent as described in greater detail below. As a result, a light source positioned within the globe 10 illuminates the globe 10. The light source further amplifies the relief areas 32 and provides a distinct visual impression in those relief areas 32. By combining appropriate coloring in the surface of the globe and providing relief areas, a very realistic and educational representation of the surface of the earth is provided.

FIGS. 2-10 generally represent the sequential steps which are followed in the manufacture of the globe of FIG. 1. Referring, therefore, to FIGS. 2 and 3, the first step in the manufacture of the globe 10 is to print a map on a flat, flexible, thin plastic (preferably vinyl) sheet 34. As shown in FIG. 3, the vinyl sheet 34 receives a layer of print 36 which is preferably multicolor. Note that either side of sheet 34 may receive print 36, or both sides of sheet 34 may receive print 36. Thus, the geographical or political regions of the hemisphere represented by FIG. 2 are visually delineated. Importantly, the map is prepared by cartographic methods which permit reshaping of sheet 34 into a hemisphere that is an accurate representation of the earth.

Subsequently, the vinyl sheet 34 with the print 36 thereon, as exemplified by FIG. 2, is formed into a hemisphere 35. The planar map shown in FIG. 2 becomes distorted by the forming process which results in the hemispherical shape shown in FIGS. 4 and 5. This type forming and distortion procedure in the manufacture of globes is known and cartographers are skilled in preparing flat projections which can be distorted generally uniformly by a forming process to provide an accurate geographical representation when in the reformed, generally hemispherical, shape. The resultant hemisphere 35 as exemplified by FIGS. 4 and 5, is rather flexible since it has been merely deformed from a planar shape to a hemispherical shape. A polar opening 38 having a key notch 40 is preferably cut through the hemisphere 35. Other means for orienting the hemisphere 35 may also be utilized. The equatorial line 16 defining the edge of hemisphere 35 is also accurately trimmed as shown in FIG. 4 so that a generally perfect hemisphere 35 is provided.

FIGS. 6-9 comprise the following steps in the process of the invention and are significant new steps in the overall process. However, the invention contemplates the total series of steps which are described.

Referring first to FIG. 6, the next step in the process is performed with a mold core 44 and a cooperative mold cavity 46. Referring first to the structure of the mold cavity 46, the cavity 46 includes a generally hemispherical depression 48 with relief areas 50 engraved therein. A plastic injection line 52 connects through the mold cavity 46 from an injection molding apparatus 54. An injection nozzle or bushing 56 projects slightly into the depression 48 along the polar axis 58 which is defined by the injection line 52. The bushing 56 is keyed to cooperate with the opening 38 and notch 40 of the hemispherical sheet 34 shown in FIG. 5. In this manner, the smooth surfaced, hemispherical sheet 34 may be properly positioned and aligned with relief areas 50 in the mold cavity 46 as the next step in the operation of the method. The molding cavity is sized to tightly receive the formed hemisphere 35. The mold cavity 46 is water chilled by a water chiller 60 connected with the cavity 46.

The mold core 44 cooperates with the mold cavity 46 and is similarly water chilled by a chiller 62. The core 44 includes a generally hemispherical projection 64 which has a planar hemispherical surface and with a diameter slightly smaller than the diameter of depression 48 and therefore remains spaced slightly from the depression 48 when the mold core 44 and mold cavity 46 are assembled. The spacing between surface 64 and depression 48 is on the order of 0.080 inches and 0.100 inches.

The mold core 44 includes a center knockout cone 66 and an annular knockout ring 68 which facilitate removal of the final molded product. The ring 68 is for formation of a locking flange in the final molded product.

The cone 66 and ring 68 are typically mounted for separation from the projection 64 by means of rods 70 driven by a plate 72. The cone 66 includes a slight depression 74 which cooperates with the bushing 56 and improves alignment of the component parts of the assembly. Otherwise, the surface of projection 64 is generally smooth.

FIG. 7 illustrates that small vents or slots 76 exist leading from the core projection 64. These slots 76 permit the exhaust of air from the interior of the mold cavity formed by the cavity and core 46 and 44 during the molding operation.

Figure 8:
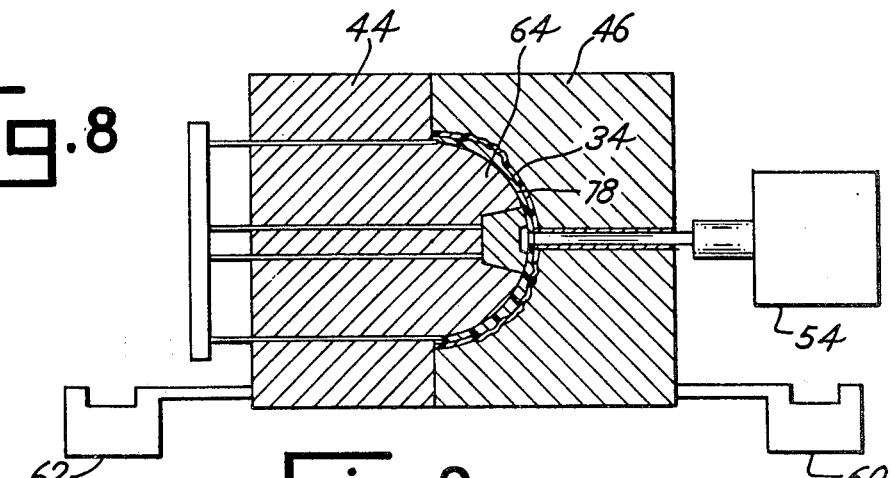
FIG. 8 is a cross sectional side view of the mold core and mold cavity of FIG. 6 subsequent to or during the molding operation.

After the hemispherical sheet 34 has been placed in the cavity 46 and properly positioned or oriented with respect to relief are as 50, the next step in the operation of the device is illustrated in FIG. 8. As shown by FIG. 8, the assembled core 44 and cavity 46 retain the hemisphere sheet 34 tightly against the depression 48 of cavity 46. A premeasured shot of plastic material, such as styrene, which has a liquid temperature in the range of about 450° Fahrenheit, is then injected into the space between the projection 64 and the sheet 34. This shot of plastic completely underlays the sheet 34 in a short period of time and drives the sheet 34 into conformance with the depression 48 including relief areas 50 of the cavity 46. In this manner, a hardened plastic layer 78 is provided defining a hemisphere of the globe 10. This is illustrated in greater detail in FIG. 11. The plastic layer 78 is preferably translucent or transparent.

To improve bonding between the molded plastic layer 78 and the sheet 34, a bonding agent may be sprayed on the interior surface of the sheet 34 prior to the molding operation. During the molding operation, of course, air, in the region between the sheet 34 and the projection 64 of the core 44, escapes through the microvents 76.

Figure 9:
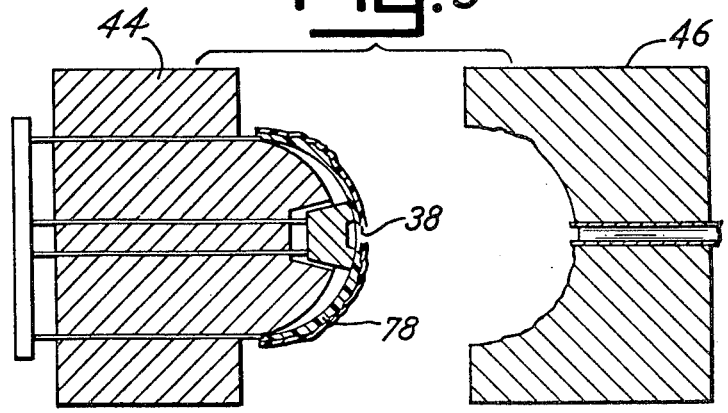
FIG. 9 is a side cross sectional view illustrating separation of the mold core and mold cavity subsequent to the step shown in FIG. 8.

Subsequent to molding, the core 44 and cavity 46 are separated and the plate 72 is operated to drive the cone 66 and ring 68 along with the molded hemisphere 12 from the projection 64 as shown in FIG. 9. The molded hemisphere 12 may then be totally removed and the operation repeated to form another hemisphere 14.

It is to be noted that each hemisphere 12, 14 requires its own core 44 and cavity 46 because of the unique relief pattern associated with each hemisphere 12, 14 and also to ensure forming of a properly mated flange assembly 86, 88 along the equator 16 of the hemispheres 12, 14. Once a northern and southern hemisphere 12 and 14 are properly formed, they can be assembled as shown in the cross sectional view of FIG. 11. The hemispherical parts 12 and 14 are retained together by means of the interlocking flanges 86 and 88 as well as an optional, appropriate bonding agent. FIG. 10 shows the formation of the flange 88 which cooperates with a mating flange 86. FIG. 12 further illustrates this relationship. An opening may be cut through hemisphere 14 and an illuminating fixture 80 positioned through the opening and maintained within the formed globe 10.

With the present invention, the use of vacuum injection molding is avoided and a precisely oriented relief globe is provided which is economical, sturdy and which provides a very high degree of accuracy. Also, the invention has been described in the context of hemispheres 12 and 14. However, the invention is not so limited. For example, various other shapes may be manufactured for assembly into a completed unit. Also, the invention has been described in terms of a terrestrial globe, However, any object may be replicated using the process of the invention including non-terrestrial objects, toys, models of vehicles and the like. Thus, while there has been set forth a preferred method of the invention, it is to be understood that the invention is to limited only by the following claims and their equivalents.

What is claimed is:

1. A method for forming at least a portion of a globe in relief, comprising, in combination:
   a. imprinting a flexible, plastic sheet with a predetermined two-dimensional printed pattern;
   b. stretch-forming said sheet into a generally concave, flexible curved form, said form having an outer surface and an inner surface;
   c. positioning the stretch-formed sheet in a mold cavity, having a generally concave surface conforming generally to the form of said sheet and including relief areas, with the outer surface of said sheet in opposed relation to mold surfaces defining said cavity;
   d. subsequently orienting printed areas of said stretch-formed sheet with respect to corresponding said relief areas;
   e. positioning a mold core in spaced relation to the inner surface;
   f. subsequently injecting a hardenable material intermediate said inner surface and the mold core and forcing the stretch-formed sheet to deform permanently into the relief areas of the mold defining said mold cavity by pressure of the injection material on the inner surface; and
   g. hardening said hardenable material to maintain the sheet in a form having relief areas conforming with the mold cavity pattern with said printed pattern substantially in register with said relief areas.

2. The method of claim 1 wherein said hardenable material is styrene.

3. The method of claim 1 wherein said first portion of a sphere is a hemisphere.

4. The method of claim 1 wherein said sheet is a flexible, vinyl plastic material.

5. The method of claim 1 including the step of forming a plurality of distinct, but compatible portions.

6. The method of claim 5 including the step of assembling the distinct portions.

* * * * *